(12) United States Patent
Miyata et al.

(10) Patent No.: US 12,496,430 B2
(45) Date of Patent: Dec. 16, 2025

(54) ROTATION TRANSMISSION STRUCTURE, CATHETER, AND GUIDE WIRE

(71) Applicant: ASAHI INTECC CO., LTD., Seto (JP)

(72) Inventors: Ayuko Miyata, Seto (JP); Erika Asahata, Seto (JP)

(73) Assignee: ASAHI INTECC CO., LTD., Seto (JP)

( * ) Notice: Subject to any disclaimer, the term of this patent is extended or adjusted under 35 U.S.C. 154(b) by 772 days.

(21) Appl. No.: 17/869,201

(22) Filed: Jul. 20, 2022

(65) Prior Publication Data

US 2022/0347427 A1 Nov. 3, 2022

Related U.S. Application Data

(63) Continuation of application No. PCT/JP2020/003621, filed on Jan. 31, 2020.

(51) Int. Cl.
*A61M 25/00* (2006.01)
*A61M 25/09* (2006.01)

(52) U.S. Cl.
CPC .......... *A61M 25/005* (2013.01); *A61M 25/09* (2013.01); *A61M 2025/09083* (2013.01)

(58) Field of Classification Search
CPC ................ A61M 25/005; A61M 25/09; A61M 2025/09083; A61M 2025/09133; A61M 2025/0915; A61M 25/0053; A61M 25/0054; A61M 25/0105; A61M 25/0133; A61M 25/0144; A61B 1/0055
See application file for complete search history.

(56) References Cited

U.S. PATENT DOCUMENTS

| | | | |
|---|---|---|---|
| 7,527,606 B2 | 5/2009 | Oepen | |
| 8,636,270 B2 | 1/2014 | Ostrovsky | |
| 2005/0054950 A1 | 3/2005 | Parins | |
| 2009/0156999 A1 | 6/2009 | Adams et al. | |
| 2018/0071496 A1 | 3/2018 | Snyder et al. | |
| 2019/0167287 A1* | 6/2019 | Vale | A61F 2/95 |
| 2020/0121308 A1 | 4/2020 | Davis et al. | |
| 2021/0008351 A1 | 1/2021 | Snyder et al. | |
| 2021/0093619 A1 | 4/2021 | Axten et al. | |
| 2022/0280147 A1 | 9/2022 | Davis et al. | |

FOREIGN PATENT DOCUMENTS

| | | | | |
|---|---|---|---|---|
| JP | 2007-503954 A | | 3/2007 | |
| JP | 2009-125774 A | | 6/2009 | |
| JP | 2012-147956 A | | 8/2012 | |
| JP | 2015-36090 A | | 2/2015 | |
| JP | 2015036090 A | * | 2/2015 | |
| JP | 2019-528882 A | | 10/2019 | |
| WO | WO-2016196177 A1 | * | 12/2016 | A61B 17/22 |

* cited by examiner

*Primary Examiner* — Bhisma Mehta
*Assistant Examiner* — Marissa Taylor
(74) *Attorney, Agent, or Firm* — Oliff PLC

(57) ABSTRACT

A rotation transmission structure includes a coil body formed by winding wires, and a reinforcing body for connecting adjacent wires of the coil body. When the wires of the coil body are connected to one another by the reinforcing body, the rigidity of a predetermined region of the rotation transmission structure in the longitudinal direction is lower than the rigidity of another region of the rotation transmission structure.

10 Claims, 14 Drawing Sheets

ROTATION TRANSMISSION STRUCTURE, CATHETER, AND GUIDE WIRE

CROSS REFERENCE TO RELATED APPLICATION

This application is a continuation application of International Application No. PCT/JP2020/003621, filed Jan. 31, 2020. The contents of this application are incorporated herein by reference in their entirety.

BACKGROUND

The disclosed embodiments relate to a rotation transmission structure, a catheter, and a guide wire.

A structure of a medical device provided with a coil including adjacent wound wires and a member that connects the adjacent wound wires of the coil is disclosed according to US Patent Document 8,636,270. The member connecting the adjacent wound wires of the coil is arranged in a portion of a region between the adjacent wound wires so that torque can be transmitted between the adjacent wound wires.

In U.S. Pat. No. 8,636,270, although an improvement in the rotation transmission properties of the rotation transmission member by a reinforcing body is investigated, adjustment of the rigidity of the rotation transmission structure by a reinforcing body is not considered.

SUMMARY

An object of the disclosed embodiments is to provide a technique that enables the rotation transmission properties of a rotation transmission member to be improved, while also allowing the rigidity of a rotation transmission structure to be adjusted.

A rotation transmission structure of the present disclosure includes a coil body formed by winding wires and a reinforcing body that connects adjacent wires of the coil body. The reinforcing body is provided such that, when the wires of the coil body are connected to one another, rigidity of a predetermined region in a longitudinal direction is lower than rigidity of another region.

The present disclosure contains a catheter including a shaft portion reinforced by the above-mentioned rotation transmission structure. The predetermined region of the rotation transmission structure is located on a distal end side of the another region.

The present disclosure also contains a guide wire including the above-mentioned rotation transmission structure and a core shaft inserted through a lumen of the rotation transmission structure. The predetermined region of the rotation transmission structure is located on a distal end side of the another region.

DETAILED DESCRIPTION OF EMBODIMENTS

Figure 1:
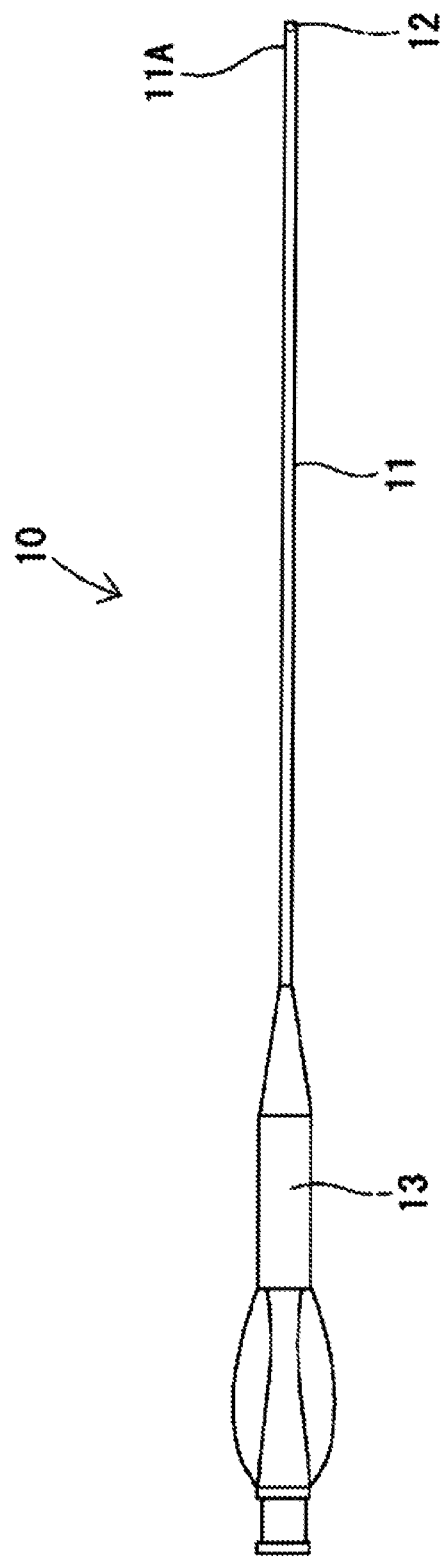
FIG. 1 is an overall view of a catheter according to an embodiment of the present disclosure.

The following is a description of an exemplary embodiment of the disclosed embodiments.

The reinforcing body may be configured by a plurality of connection portions provided in each section that connects the wires to one another, and the plurality of connection portions may be arranged more sparsely in a predetermined region (e.g., a "first region") than in another region (e.g., a "second region"). According to this configuration, the rigidity of the rotation transmission structure can be suitably adjusted by changing the arrangement of the plurality of connection portions.

The plurality of connection portions may be arranged along a virtual helical shape, and a pitch of the helical shape in the predetermined region may be larger than a pitch of the helical shape in the another region. According to this configuration, the rigidity of the rotation transmission structure can be suitably adjusted by changing the pitch of the helical shape.

The reinforcing body may be configured by a plurality of connection portions provided in each section that connects the wires to one another, and a Young's modulus of a material of the connection portions arranged in the predetermined region may be smaller than a Young's modulus of a material of the connection portions arranged in the another region. According to this configuration, the rigidity of the rotation transmission structure can be suitably adjusted by changing the Young's modulus of the material of the connection portions.

The reinforcing body may be configured by a plurality of connection portions provided in each section that connects the wires to one another, and the plurality of connection portions may be arranged along a virtual helical shape in an opposite direction to a winding direction of the coil body. According to this configuration, the rotation transmission properties are better than those in a configuration where the plurality of connection portions are arranged along a virtual helical shape in the same direction as the winding direction of the coil body.

The reinforcing body may be configured by a plurality of connection portions provided in each section that connects the wires to one another, and the plurality of connection portions may be arranged along multiple virtual helical shapes. According to this configuration, the range over which the rigidity can be adjusted by the reinforcing body can be made larger than that in a configuration where the plurality of connection portions are arranged along a single helical shape.

An outer diameter of the reinforcing body may be less than or equal to a maximum outer diameter of the coil body. According to this configuration, the outer diameter of the rotation transmission structure can be prevented from becoming larger as a result of providing the reinforcing body.

An inner diameter of the reinforcing body may be greater than or equal to a minimum inner diameter of the coil body. According to this configuration, the inner diameter of the rotation transmission structure can be prevented from becoming smaller as a result of providing the reinforcing body.

A catheter of the disclosed embodiments includes a shaft portion reinforced by the rotation transmission structure described above, and the predetermined region of the rotation transmission structure may be located on a distal end side of the another region. According to this configuration, it is possible to realize a catheter having excellent rotation transmission properties, and which also ensures flexibility of the distal end portion.

A guide wire of the disclosed embodiments includes the rotation transmission structure described above and a core shaft inserted through a lumen of the rotation transmission structure, and the predetermined region of the rotation transmission structure may be located on a distal end side of the another region. According to this configuration, it is possible to realize a guide wire having excellent rotation transmission properties, and which also ensures flexibility of the distal end portion.

Next, an embodiment that embodies the disclosed embodiments will be described with reference to FIG. 1 to FIG. 6. In FIG. 1, the right side of the drawing is the distal end side (farther side) inserted into the body, and the left side is the proximal end side (near side, rear end side) operated by an operator such as a physician.

FIG. 1 is an explanatory diagram showing a medical catheter (a type of medical device) 10 provided with a rotation transmission structure 20. The catheter 10 includes a shaft portion 11, a distal tip 12 provided on the distal end side of the shaft portion 11, and a connector 13 provided on the proximal end side of the shaft portion 11. In the shaft portion 11, the rigidity of the distal end portion 11A of the shaft portion 11 is lower than the rigidity of the section other than the distal end portion 11A. The section of the shaft portion 11 other than the distal end portion 11A is a section also referred to as a body portion or a proximal end portion of the shaft portion 11.

Figure 2:
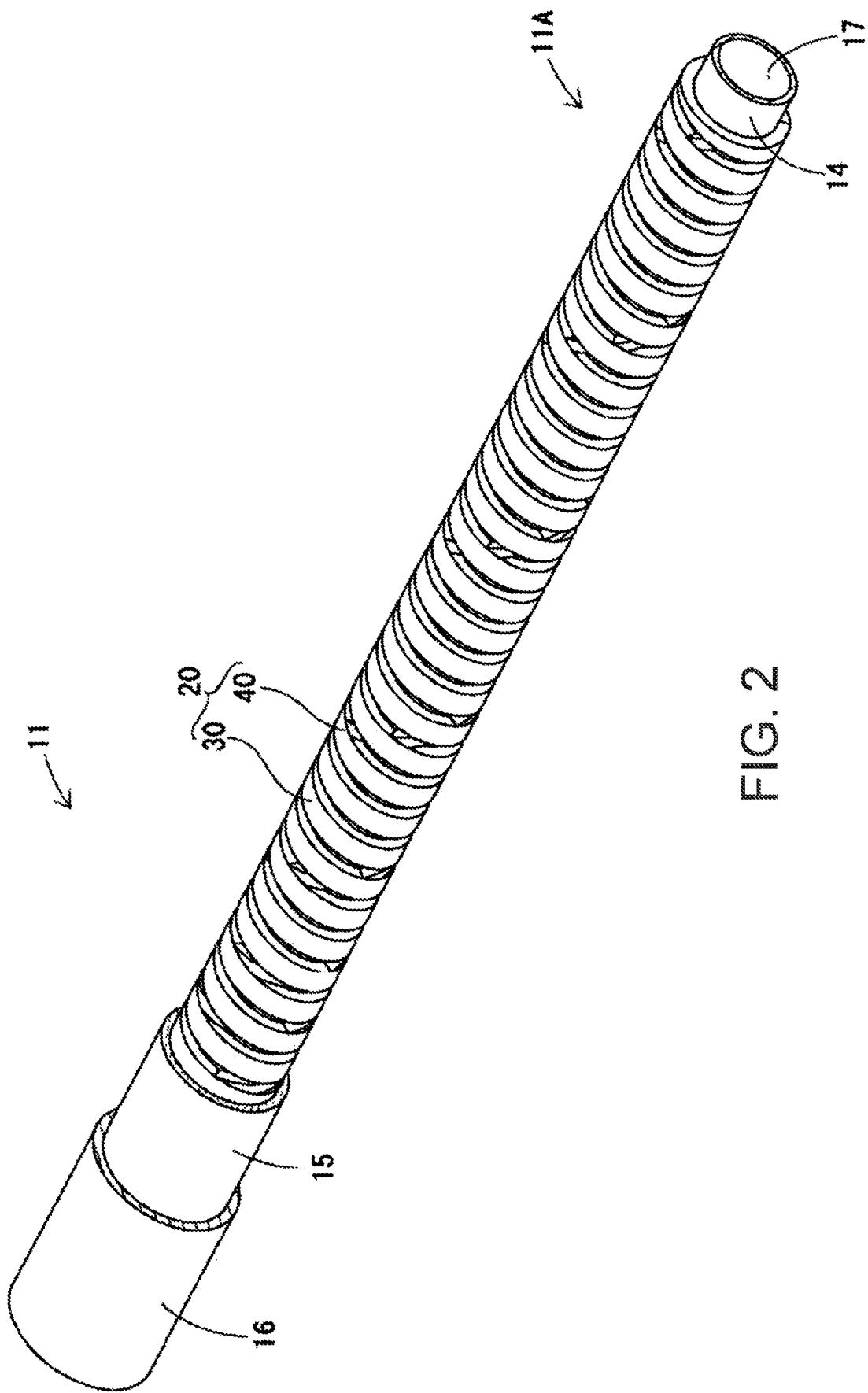
FIG. 2 is an explanatory view showing a shaft portion. For illustration purposes, the drawing shows the distal tip, a portion of the middle layer, and a portion of the outer layer removed.

As shown in FIG. 2, the shaft portion 11 includes, in order from the inside, an inner layer 14, a rotation transmission structure 20 serving as a reinforcing body, a middle layer 15, and an outer layer 16.

The inner layer 14 is made of resin and constitutes a lumen 17 for inserting a guide wire or another catheter inside. The resin material forming the inner layer 14 is not particularly limited, but in the present embodiment, PTFE (polytetrafluoroethylene) is used. The rotation transmission structure 20 serving as the reinforcing body is formed on the outer periphery of the inner layer 14. The configuration of the rotation transmission structure 20 will be described later.

The middle layer 15 made of resin is formed on the outer periphery of the rotation transmission structure 20, and covers the inner layer 14 and the rotation transmission structure 20. The resin material used to form the middle layer 15 is not particularly limited, and polyamide, polyamide elastomer, polyester, polyurethane or the like can be used.

Figure 3:
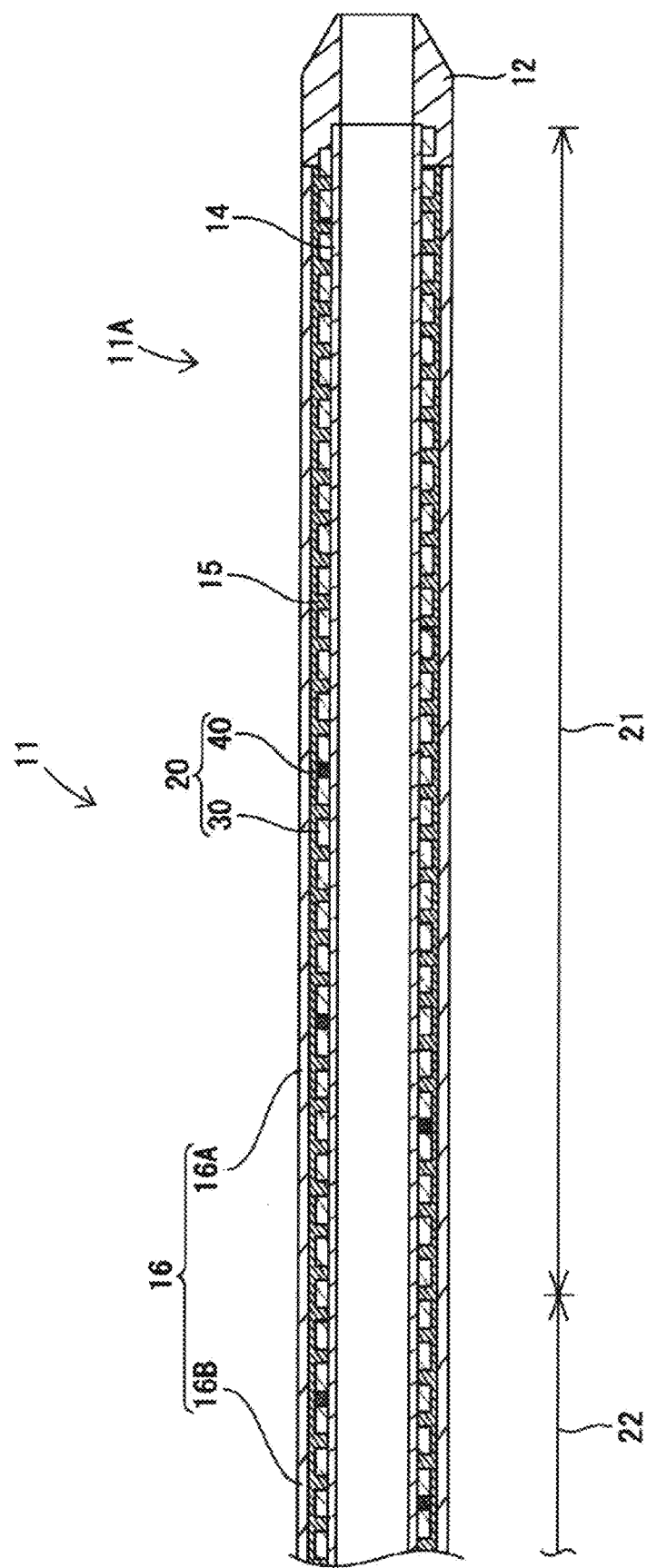
FIG. 3 is a cross-sectional view of a shaft portion and a distal tip.

As shown in the cross-sectional view in FIG. 3, the middle layer 15 covers the shaft portion 11 except for the distal tip 12. The middle layer 15 is bonded to the inner layer 14 in the gaps of the rotation transmission structure 20 (in other words, the gaps 32 between adjacent wires 31).

The outer layer 16 made of resin is formed on the outer periphery of the middle layer 15, and covers the middle layer 15. Like the middle layer 15, the resin material used to form the outer layer 16 is not particularly limited, and polyamide, polyamide elastomer, polyester, polyurethane or the like can be used. The outer layer 16 may be made using resin materials having different hardnesses so as to become more flexible toward the distal end portion 11A side of the shaft portion 11. For example, a first outer layer 16A covering the distal end portion 11A may be made of a more flexible resin than a second outer layer 16B that covers the section other than the distal end portion 11A.

Figure 4:
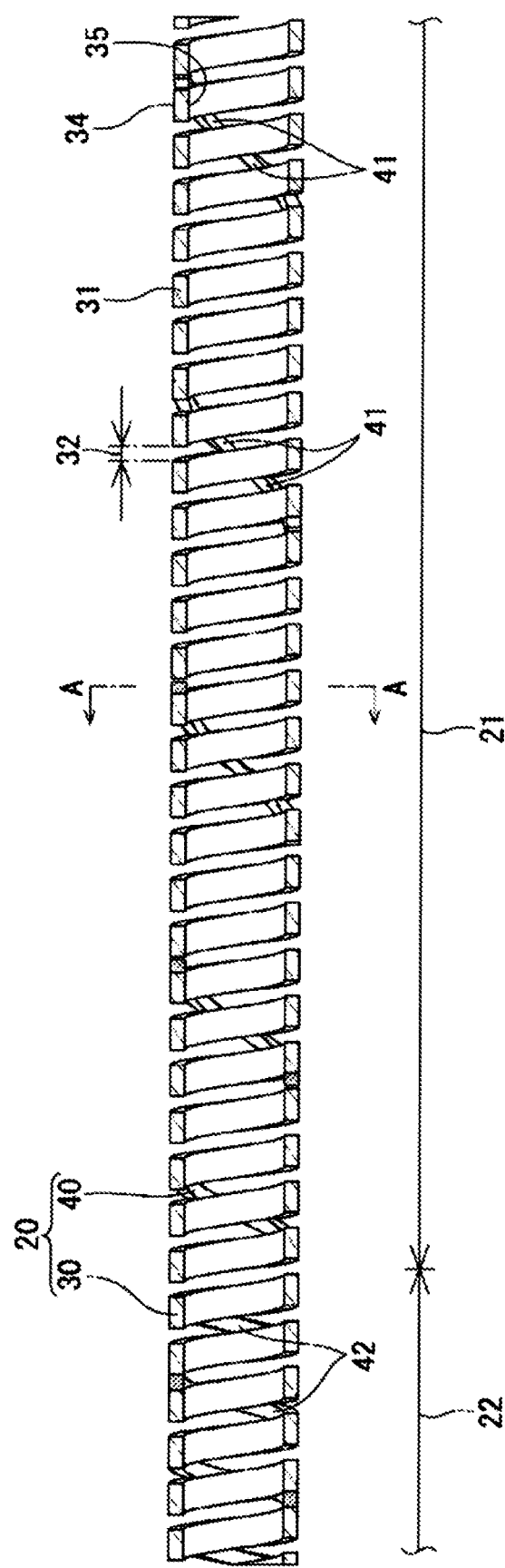
FIG. 4 is a cross-sectional view of a rotation transmission structure.

As shown in FIG. 4, the rotation transmission structure 20 includes a coil body 30 and a reinforcing body 40. The rotation transmission structure 20 has a first region 21, and a second region 22 located on the proximal end side of the first region 21. The first region 21 corresponds to a predetermined region in the longitudinal direction. The second region 22 corresponds to another region. Specifically, the first region 21 constitutes the distal end portion 11A of the shaft portion 11. The second region 22 constitutes the section of the shaft portion 11 other than the distal end portion 11A.

Figure 5:
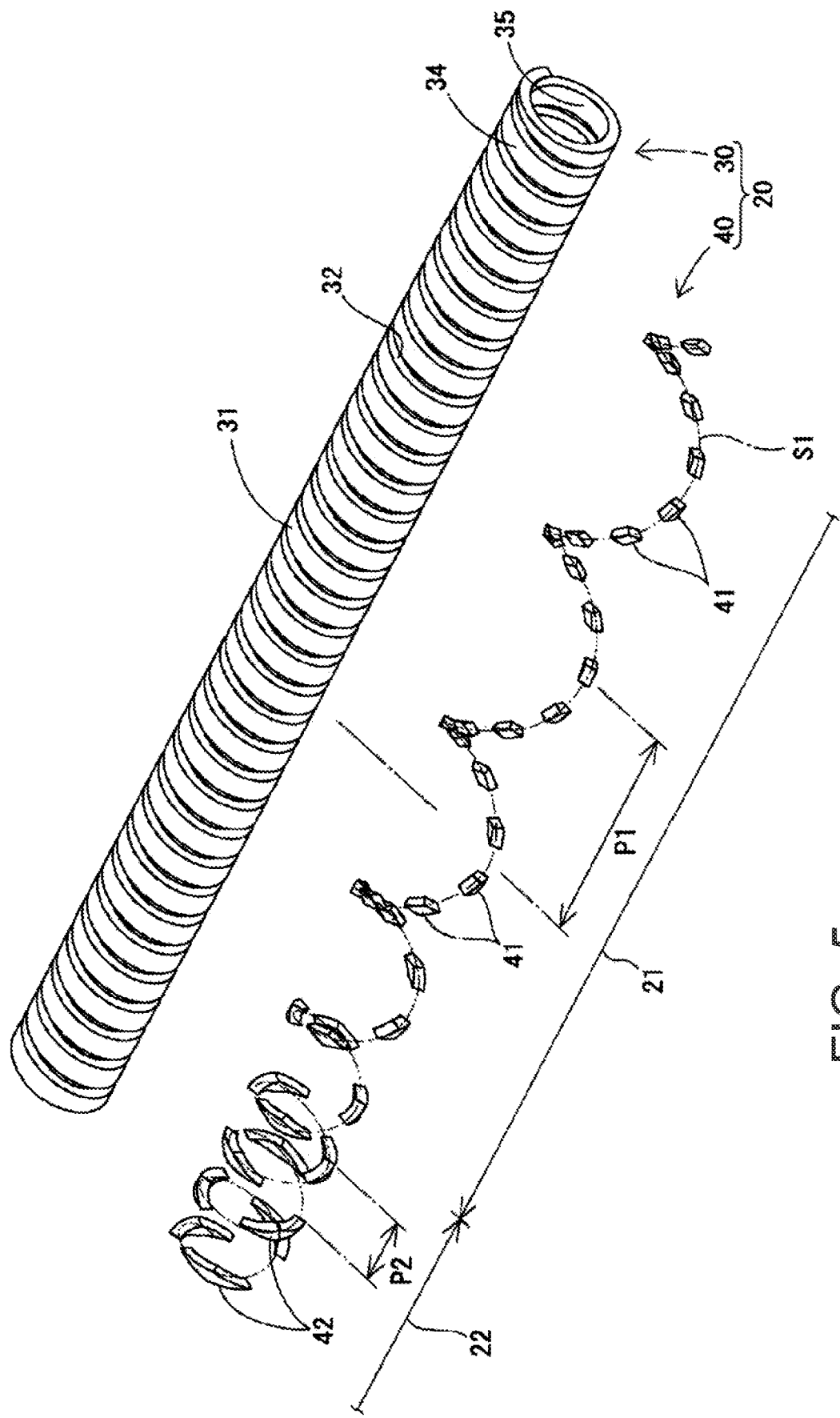
FIG. 5 is an exploded perspective view of a rotation transmission structure.

As shown in FIG. 4 and FIG. 5, the coil body 30 is formed by winding wires 31. The wires 31 are flattened wires. The cross-sectional shape of the wires may be substantially rectangular, or may be substantially circular or polygonal. The diameter of the wires 31 is substantially constant over the entire length. The material of the wires 31 is not particularly limited, but is preferably a biocompatible material that is resistant to corrosion, such as stainless steel alloy (SUS), nickel titanium alloy (NiTi), titanium (Ti), platinum (Pt), tungsten (W), gold (Au), and silver (Ag).

The coil body 30 is wound in a helical shape. The outer diameter and the inner diameter of the coil body 30 is substantially constant over the entire length of the coil body 30. When the coil body 30 is not reinforced by the reinforcing body 40, the flexural rigidity and torsional rigidity are substantially constant over the entire length. The coil body 30 adopts a so-called coarse winding, in which the adjacent wires 31 are not in contact with one another. In other words, the coil body 30 has gaps 32 that are formed between the adjacent wires 31.

The reinforcing body 40 is a member that connects the adjacent wires 31 of the coil body 30 to one another. The material of the reinforcing body 40 is not particularly limited, and may be the same material as the coil body 30 or may be a different material from the coil body 30. Examples of the material of the reinforcing body 40 include metal materials such as stainless steel (SUS), nickel-titanium alloy (NiTi), titanium (Ti), and nickel-chromium alloy (NiCr), metal brazing materials, and resin-based adhesives. Furthermore, the reinforcing body 40 may be formed of a portion of the material constituting the coil body 30 by welding the wires 31 to one another. In the present embodiment, all areas of the reinforcing body 40 are formed of the same material.

The reinforcing body 40 is provided such that, when the wires 31 of the coil body 30 are connected to one another, the rigidity of the first region 21 is lower than the rigidity of the second region 22. The reinforcing body 40 is provided in both the first region 21 and the second region 22. The rigidity of the first region 21 is higher than the rigidity of the coil body 30 which is not connected by the reinforcing body 40, and lower than the rigidity of the second region 22. The rigidity of the rotation transmission structure 20 gradually decreases from the second region 22 toward the first region 21. Flexural rigidity and torsional rigidity are examples of rigidity indexes.

The reinforcing body 40 is configured by a plurality of connection portions 41 and 42 provided in each section that connect the wires 31 to one another. Among the plurality of connection portions 41 and 42, the plurality of connection portions 41 are arranged in the first region 21, and the plurality of connection portions 42 are arranged in the second region 22.

The plurality of connection portions 41 are arranged more sparsely in the first region 21 than the plurality of connection portions 42 in the second region 22. In other words, the density of the plurality of connection portions 41 is smaller than the density of the plurality of connection portions 42. The density of the plurality of connection portions 41 can be calculated, for example, as the mass of the plurality of connection portions 41 per unit length of the coil body 30. Here, the unit length of the coil body 30 may be appropriately set according to the distribution of the plurality of connection portions 41 and 42. The density of the plurality of connection portions 42 can be calculated in the same manner as the density of the plurality of connection portions 41. The density of the plurality of connection portions 41 and 42 can be adjusted by changing the number, size, arrangement (pitch of the helical shape and number of helical shapes as described below) or the like of the connection portions.

The plurality of connection portions 41 and 42 are arranged along a single virtual helical shape S1. The helical shape S1 is in the opposite direction to the winding direction of the coil body 30, and for example, when the coil body 30 is wound in an anticlockwise direction toward the distal end (S-twisted), the plurality of connection portions 41 and 42 are arranged along the virtual helical shape S1 which is wound in a clockwise direction toward the distal end (Z-twisted).

The pitch P1 of the helical shape S1 in the first region 21 is larger than the pitch P2 of the helical shape S1 in the second region 22. In other words, the rotation transmission structure 20 has a configuration in which the pitch of the helical shape S1 is variable in order to adjust the rigidity. The pitch of the helical shape S1 is the dimension between the windings of the helical shape S1 in the length direction of the rotation transmission structure 20. The pitch P1 of the helical shape S1 in the first region 21 becomes gradually larger toward the distal end side.

The size of the connection portions 41 is smaller than the size of the connection portions 42. Specifically, in the winding direction of the wires 31, the dimensions of the connection portions 41 are smaller than the dimensions of the connection portions 42. The size of the plurality of connection portions 41 and 42 becomes gradually smaller toward the distal end side.

Figure 6:
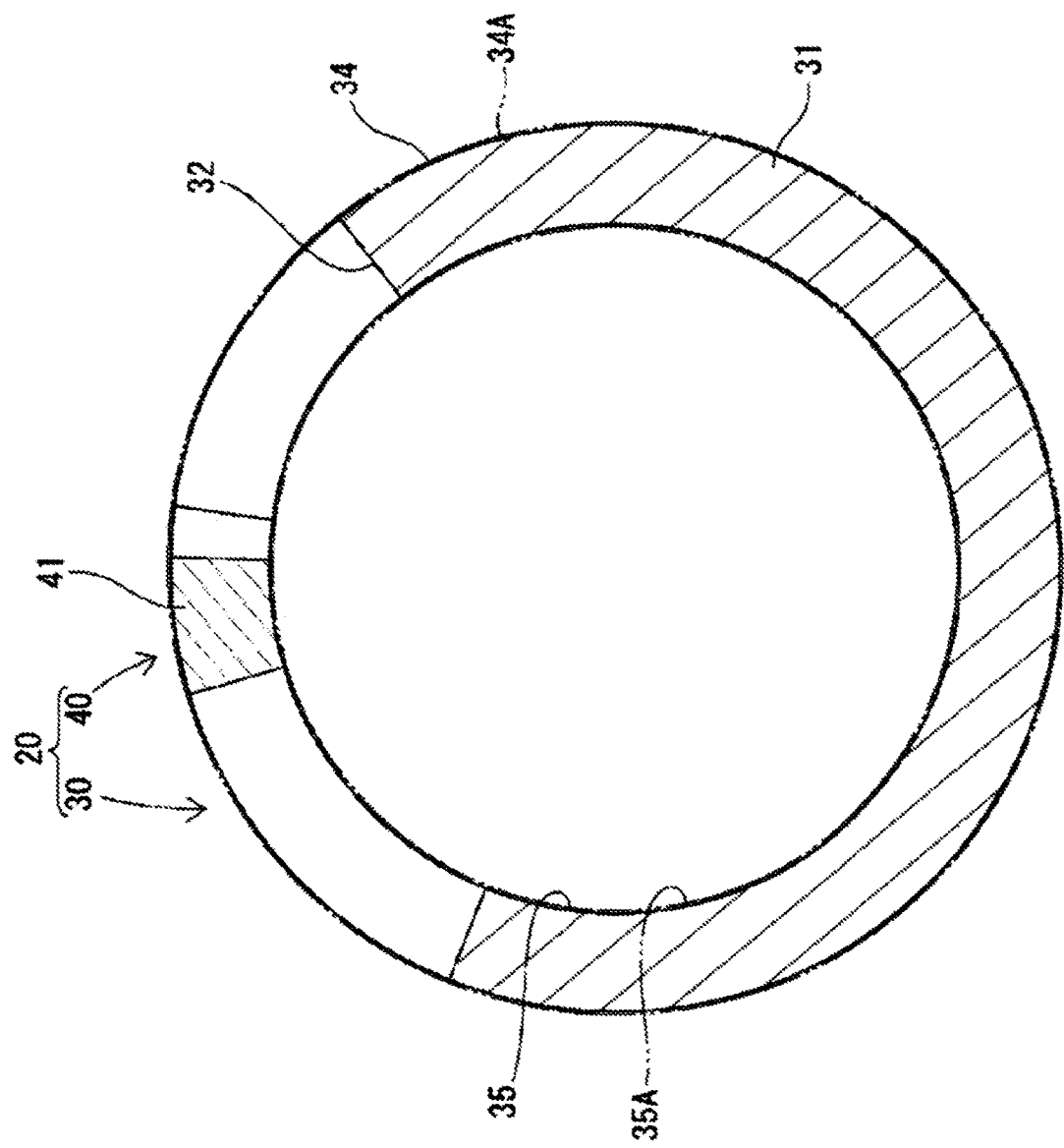
FIG. 6 is a cross-sectional view taken along line A-A in FIG. 4.

As shown in FIG. 6, the outer diameter of the reinforcing body 40 is less than or equal to the maximum outer diameter of the coil body 30. In other words, the reinforcing body 40 is arranged on the inner peripheral side of a virtual cylindrical surface 34A circumscribed around the outer peripheral surface 34 of the coil body 30. Furthermore, the inner diameter of the reinforcing body 40 is greater than or equal to the minimum inner diameter of the coil body 30. In other words, the reinforcing body 40 is arranged on the outer peripheral side of a virtual cylindrical surface 35A inscribed in the inner peripheral surface 35 of the coil body 30. That is, the reinforcing body 40 takes a form in which the plurality of connection portions 41 and 42 are arranged in the gaps 32 between wires 31 that are adjacent to each other. The outer surface of the reinforcing body 40 is flush with the outer peripheral surface 34 of the coil body 30. The inner surface of the reinforcing body 40 is flush with the inner peripheral surface 35 of the coil body 30. The size and arrangement of the reinforcing body 40 are not limited to this. For example, in the radial direction of the coil body 30, a configuration is possible in which the dimensions of the reinforcing body 40 (connection portions 41 and 42) are smaller than the thickness dimension of the wires 31, and the connection portions 41 and 42 are located between the outer peripheral surface 34 and the inner peripheral surface 35.

Next, the effects of the present embodiment will be described.

According to the rotation transmission structure 20 of the present embodiment, the rotation transmission properties of the rotation transmission structure 20 can be improved compared to a coil body that is not reinforced by the reinforcing body 40, and the rigidity of the rotation transmission structure 20 can also be adjusted by the reinforcing body 40. For example, according to the rotation transmission structure 20, it is possible to improve the operability of the catheter 10 by increasing the rigidity of the section of the shaft portion 11 other than the distal end portion 11A, while also ensuring the flexibility of the rotation transmission structure 20 with the distal end portion 11A of the shaft portion 11.

In order to confirm the effects of the present embodiment, the flexural rigidity of the rotation transmission structure was calculated by simulation with the pitch of the helical shape of the reinforcing body changed. From this result, it was confirmed that the flexural rigidity decreases when the pitch of the helical shape of the reinforcing body is increased. Furthermore, the torsional rigidity of the rotation transmission structure was calculated by simulation with the pitch of the helical shape of the reinforcing body changed. From this result, it was confirmed that the torsional rigidity decreases when the pitch of the helical shape of the reinforcing body is increased. In addition, it was confirmed that when the pitch is increased in steps, the flexural rigidity tends to be smaller than the torsional rigidity under predetermined conditions. This result suggested that, for example, by reducing the flexural rigidity while maintaining the torsional rigidity corresponding to the parts of the rotation transmission structure 20, or the like, a flexural rigidity and torsional rigidity corresponding to a medical device to which the rotation transmission structure 20 has been applied can be realized by the reinforcing body 40.

Furthermore, in a configuration where a slot pattern is formed on the side surface of the tubular member in order to adjust the rigidity of the rotation transmission structure, when a rotational force is applied to the rotation transmission structure, stress is concentrated on the opening edge of the slot formed in the tubular member, and there is a concern that the rotation transmission structure may break or the like. In contrast, in the present embodiment, when a rotational force is applied to the rotation transmission structure 20, even if some of the connections between the wires 31 of the coil body 30 become detached, the coil body 30 itself can be prevented from breaking.

In the present embodiment, the plurality of connection portions 41 in the first region 21 are arranged more sparsely than the plurality of connection portions 42 in the second region 22. This enables the rigidity of the rotation transmission structure 20 to be suitably adjusted by changing the arrangement of the plurality of connection portions 41 and 42.

In the present embodiment, the pitch P1 of the helical shape S1 in the first region 21 is larger than the pitch P2 of the helical shape S1 in the second region 22. This enables the rigidity of the rotation transmission structure 20 to be suitably adjusted by changing the pitches P1 and P2 of the helical shape S1.

In the present embodiment, the plurality of connection portions 41 and 42 are arranged along a virtual helical shape S1 in the opposite direction to the winding direction of the coil body 30. Consequently, the rotation transmission properties are better than those in a configuration where the plurality of connection portions 41 and 42 are arranged along a virtual helical shape S1 in the same direction as the winding direction of the coil body 30.

In the present embodiment, the outer diameter of the reinforcing body 40 is less than or equal to the maximum outer diameter of the coil body 30. This prevents the outer diameter of the rotation transmission structure 20 from becoming larger as a result of providing the reinforcing body 40. The inner diameter of the reinforcing body 40 is greater than or equal to the minimum inner diameter of the coil body 30. This prevents the inner diameter of the rotation transmission structure 20 from becoming smaller as a result of providing the reinforcing body 40. Further, in the present embodiment, the reinforcing body 40 is arranged in the gaps 32 between the wires 31. As a result, when the rotation transmission structure 20 is pushed in, the pushing force can be more easily transmitted to the distal end side, and the pushability of the rotation transmission structure 20 can be improved.

The catheter 10 of the present embodiment includes the shaft portion 11 reinforced by the rotation transmission structure 20 described above, and the first region 21 of the rotation transmission structure 20 is located on the distal end side of the second region 22. This makes it possible to realize the catheter 10 having excellent rotation transmission properties, and which ensures flexibility of the distal end portion 11A.

Figure 7:
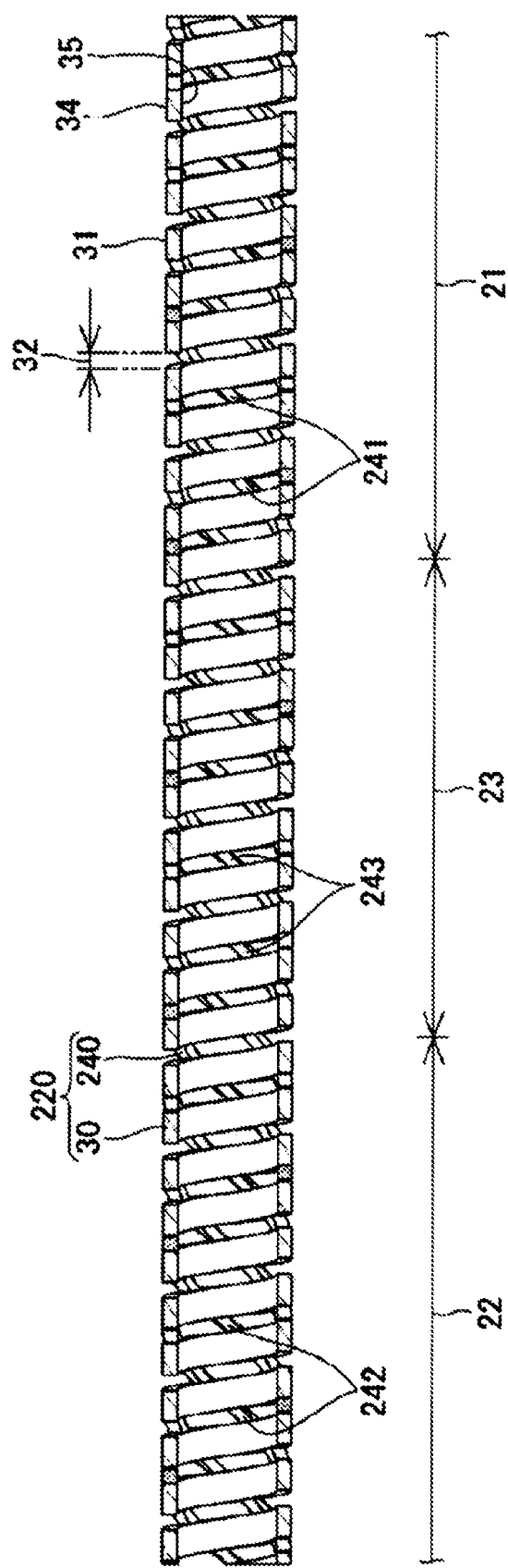
FIG. 7 is a cross-sectional view of a rotation transmission structure according to an embodiment of the present disclosure.
Figure 8:
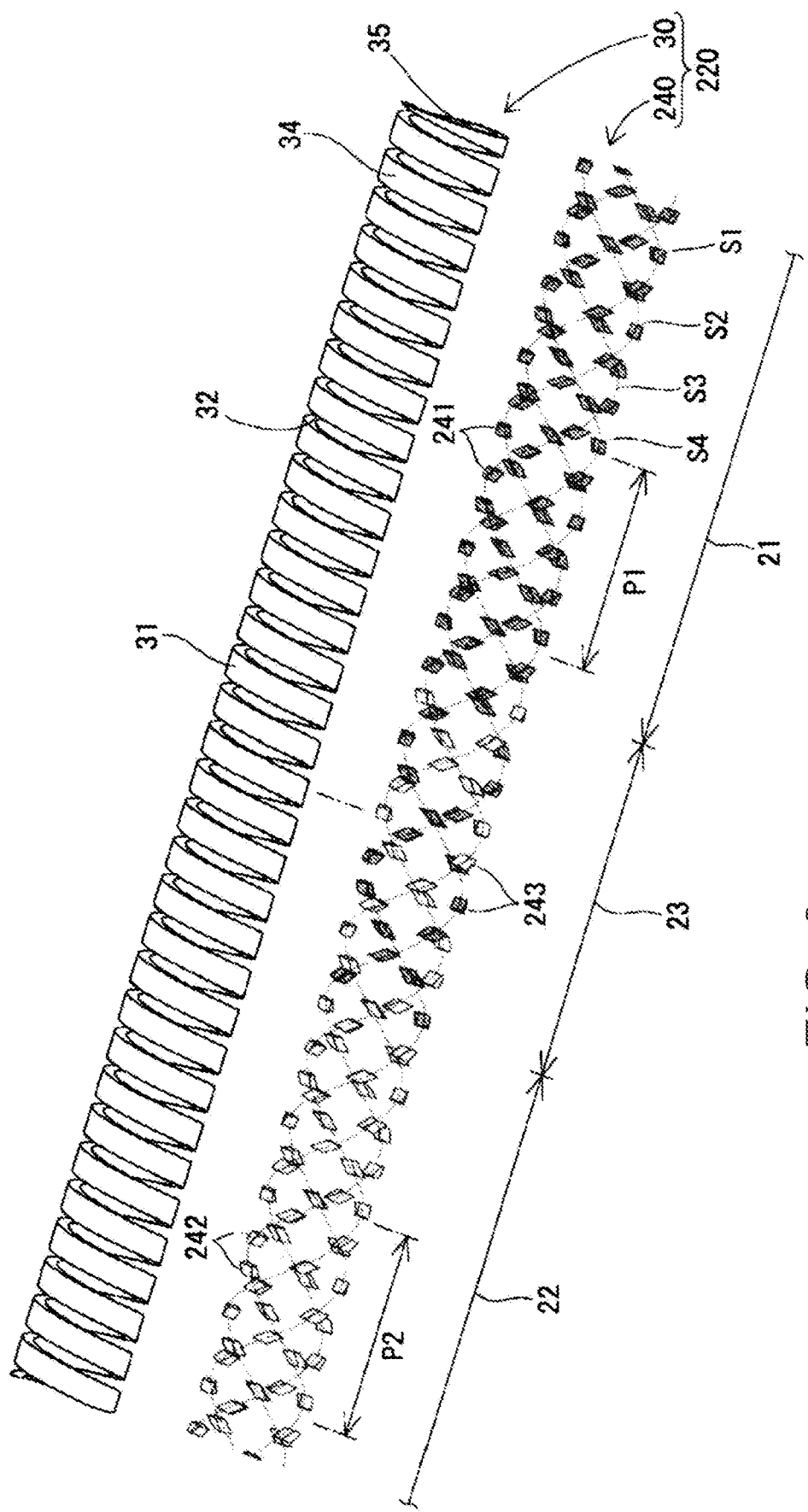
FIG. 8 is an exploded perspective view of a rotation transmission structure.

As shown in FIG. 7 and FIG. 8, a rotation transmission structure 220 according to an embodiment of the present disclosure has a reinforcing body with a different configuration to that of the rotation transmission structure 20 described above. Configurations that are identical to those in the rotation transmission structure 20 are designated by the same reference numerals, and duplicate description will not be repeated.

The rotation transmission structure 220 includes a coil body 30 and a reinforcing body 240. The rotation transmission structure 220 has a first region 21, and a second region 22 located on the proximal end side of the first region 21, and an intermediate region 23 located between the first region 21 and the second region 22. The first region 21 corresponds to a predetermined region in the longitudinal direction. The second region 22 corresponds to another region. Specifically, the first region 21 constitutes the distal end portion 11A of the shaft portion 11. The second region 22 constitutes the proximal end portion of the shaft portion 11.

The reinforcing body 240 is provided such that, when the wires 31 of the coil body 30 are connected to one another, the rigidity of the first region 21 is lower than the rigidity of the second region 22. The reinforcing body 240 is provided in the first region 21, the second region 22, and the intermediate region 23. The rigidity of the first region 21 is higher than the rigidity of the coil body 30 which is not provided with the reinforcing body 240, and lower than the rigidity of the second region 22 and the intermediate region 23. The rigidity of the intermediate region 23 is lower than the rigidity of the second region 22. The rigidity of the rotation transmission structure 220 decreases in multiple steps from the second region 22 toward the first region 21. Flexural rigidity and torsional rigidity are examples of rigidity indexes.

The reinforcing body 240 is configured by a plurality of connection portions 241, 242 and 243 provided in each section that connects the wires 31 to one another. Among the plurality of connection portions 241, 242 and 243, the plurality of connection portions 241 are arranged in the first region 21, and the plurality of connection portions 242 are arranged in the second region 22. The plurality of connection portions 243 are arranged in the intermediate region 23. The plurality of connection portions 241 correspond to the connection portions arranged in the predetermined region. The plurality of connection portions 242 correspond to the connection portions arranged in the another region.

The plurality of connection portions 241, 242 and 243 are arranged along four virtual helical shapes S1 to S4. Each of the four helical shapes S1 to S4 are in the opposite direction to the winding direction of the coil body 30, and for example, when the coil body 30 is wound in an anticlockwise direction toward the distal end (S-twisted), the plurality of connection portions 241, 242 and 243 are arranged along the virtual helical shapes S1 to S4 which are wound in a clockwise direction toward the distal end (Z-twisted). The four helical shapes S1 to S4 are arranged such that they are offset by 90° from each other in the circumferential direction. The density of the plurality of connection portions 241 is the same as the density of the plurality of connection portions 242.

The Young's modulus of the material forming the connection portions 241 is smaller than the Young's modulus of the material forming the connection portions 242. Specifically, the plurality of connection portions 241 are made of the same first material. In FIG. 8, the connection portions formed of the first material are shown in black (darker shade). The plurality of connection portions 242 are made of the same second material. In FIG. 8, the connection portions formed of the second material are shown in white (lighter shade). The Young's modulus of this first material is smaller than the Young's modulus of the second material. Among the plurality of connection portions 243, half of the connection portions 243 are composed of the first material, and the remaining half of the connection portions 243 among the plurality of connection portions 243 are composed of the second material. Of the four helical shapes S1 to S4, the plurality of connection portions 243 composed of the first material are arranged along the two helical shapes S1 and S3. Of the four helical shapes S1 to S4, the plurality of connection portions 243 composed of the second material are arranged along the two helical shapes S2 and S4.

Next, the effects of the present embodiment will be described.

According to the rotation transmission structure 220 of the present embodiment, the rotation transmission properties can be improved compared to a coil body that is not connected by the reinforcing body 240, and the rigidity of the rotation transmission structure 220 can also be adjusted by the reinforcing body 240. For example, according to the rotation transmission structure 220, it is possible to improve the operability of the catheter 10 by increasing the rigidity of the section of the shaft portion 11 other than the distal end portion 11A, while also ensuring the flexibility of the rotation transmission structure 220 in the distal end portion 11A of the shaft portion 11.

In order to confirm the effects of the present embodiment, the flexural rigidity of the rotation transmission structure was calculated by simulation with the Young's modulus of the material forming the plurality of connection portions changed. From this result, it was confirmed that the flexural rigidity decreases when the Young's modulus of the material forming the plurality of connection portions is decreased. Furthermore, the torsional rigidity of the rotation transmission structure was calculated by simulation with the Young's modulus of the material forming the plurality of connection portions changed. From this result, it was confirmed that the torsional rigidity decreases when the Young's modulus of the material forming the plurality of connection portions is decreased. In addition, it was confirmed that when the Young's modulus of the material forming the reinforcing body is decreased in steps, the flexural rigidity tends to be smaller than the torsional rigidity under predetermined conditions. This result suggested that, for example, by reducing the flexural rigidity while maintaining the torsional rigidity corresponding to the parts of the rotation transmission structure 220, or the like, a flexural rigidity and torsional rigidity corresponding to a medical device to which the rotation transmission structure 220 has been applied can be realized by the reinforcing body 240.

The Young's modulus of the material of the connection portions 241 arranged in the first region 21 is smaller than the Young's modulus of the material of the connection portions 242 arranged in the second region 22. This enables the rigidity of the rotation transmission structure 220 to be suitably adjusted by changing the Young's modulus of the material of the connection portions 241 and 242.

The plurality of connection portions 241 and 242 are arranged along the multiple virtual helical shapes S1 to S4. This enables the range over which the rigidity can be adjusted by the plurality of connection portions 241 and the plurality of connection portions 242 to be made larger than that in a configuration where the plurality of connection portions 241 and 242 are arranged along a single virtual helical shape.

In the present embodiment, because the plurality of connection portions 243 composed of a material having a different Young's modulus are arranged in the intermediate region 23, the rigidity of the rotation transmission structure 220 can be gradually changed.

Figure 9:
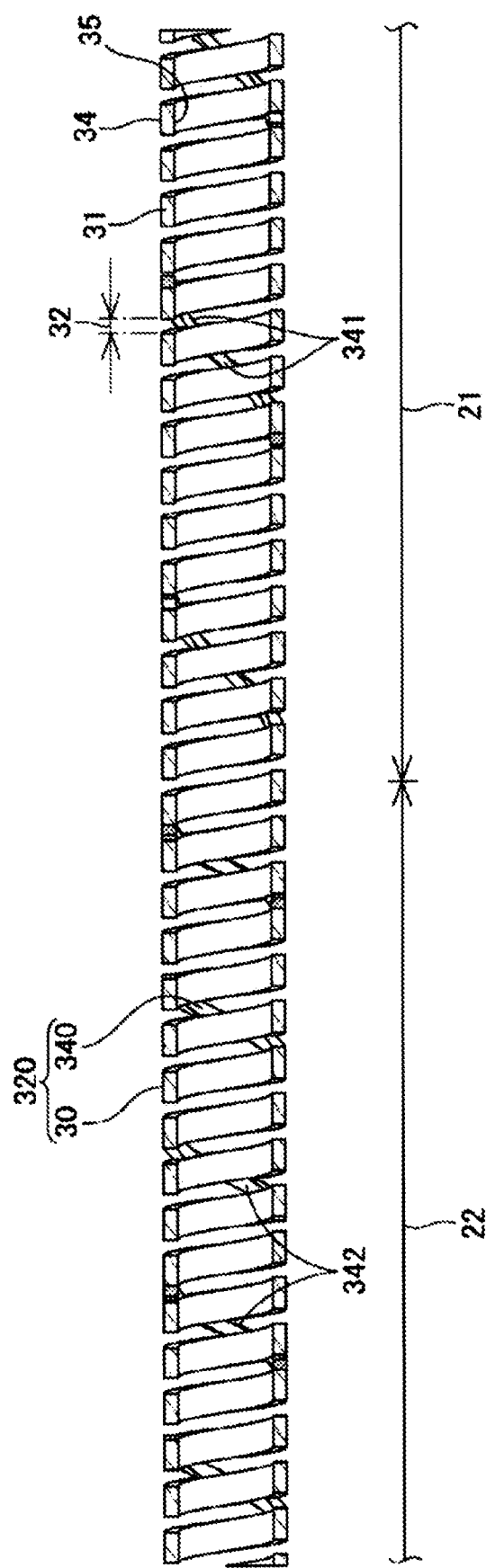
FIG. 9 is a cross-sectional view of a rotation transmission structure according to an embodiment of the present disclosure.
Figure 10:
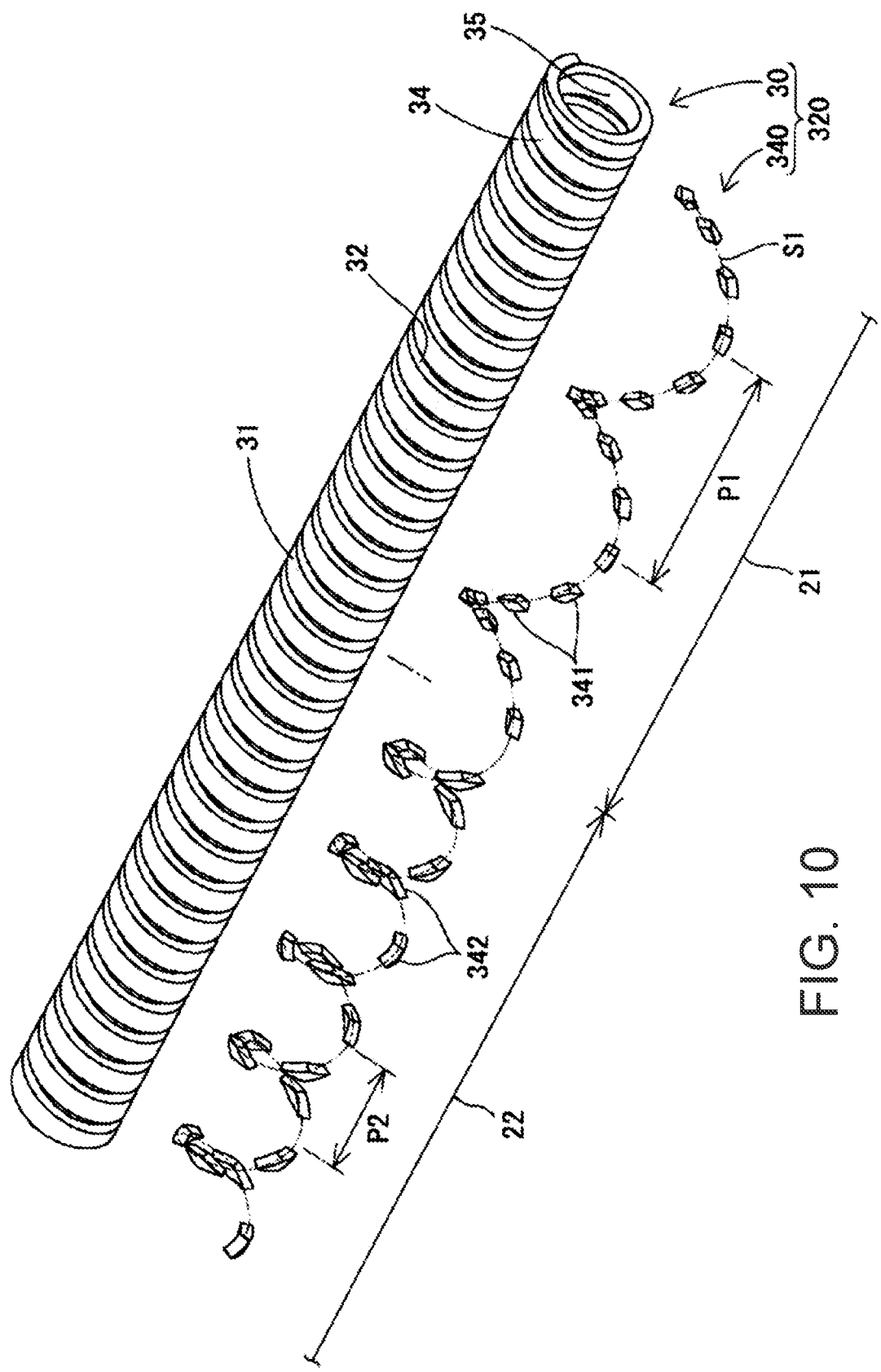
FIG. 10 is an exploded perspective view of a rotation transmission structure.

As shown in FIG. 9 and FIG. 10, a rotation transmission structure 320 according to an embodiment of the present disclosure has a reinforcing body with a different configuration to that of the rotation transmission structure 20 described above. Configurations that are identical to those in the rotation transmission structure 20 are designated by the same reference numerals, and duplicate description will not be repeated.

The reinforcing body 340 is configured by a plurality of connection portions 341 and 342 provided in each section that connects the wires 31 to one another. Among the plurality of connection portions 341 and 342, the plurality of connection portions 341 are arranged in the first region 21, and the plurality of connection portions 342 are arranged in the second region 22. The plurality of connection portions 341 and 342 are arranged along a single virtual helical shape S1. The helical shape S1 is in the opposite direction to the winding direction of the coil body 30, and for example, when the coil body 30 is wound in an anticlockwise direction toward the distal end (S-twisted), the plurality of connection portions 341 and 342 are arranged along the virtual helical shape S1 which is wound in a clockwise direction toward the distal end (Z-twisted).

The plurality of connection portions 341 in the first region 21 are arranged more sparsely than the plurality of connection portions 342 in the second region 22. In other words, the density of the plurality of connection portions 341 is smaller than the density of the plurality of connection portions 342. The density of the plurality of connection portions 341 can be calculated, for example, as the mass of the plurality of connection portions 341 per unit length of the coil body 30. The density of the plurality of connection portions 342 can be calculated in the same manner. Here, the unit length of the coil body 30 may be appropriately set according to the distribution of the plurality of connection portions 341 and 342.

The pitch P1 of the helical shape S1 in the first region 21 is larger than the pitch P2 of the helical shape S1 in the second region 22. The pitch of the helical shape S1 is the dimension between the windings of the helical shape S1 in the length direction of the rotation transmission structure 320. The pitch P1 of the helical shape S1 in the first region 21 is the same in all areas, and the pitch P2 of the helical shape S1 in the second region 22 is the same in all areas. In other words, the pitch of the helical shape S1 increases in steps toward the distal end side.

In the present embodiment, the rigidity of the rotation transmission structure 320 can be suitably adjusted by a simple configuration in which pitch of the helical shape is changed in steps. The rigidity of the rotation transmission structure 320 decreases in steps from the second region 22 toward the first region 21.

Figure 11:
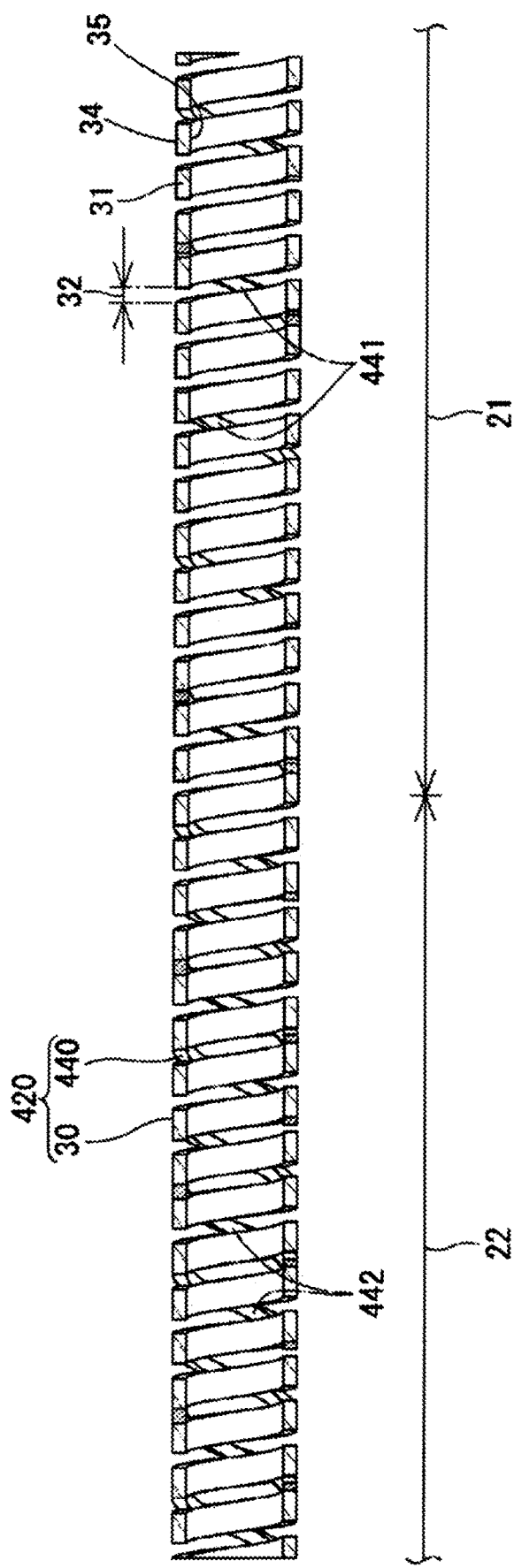
FIG. 11 is a cross-sectional view of a rotation transmission structure according to an embodiment of the present disclosure.
Figure 12:
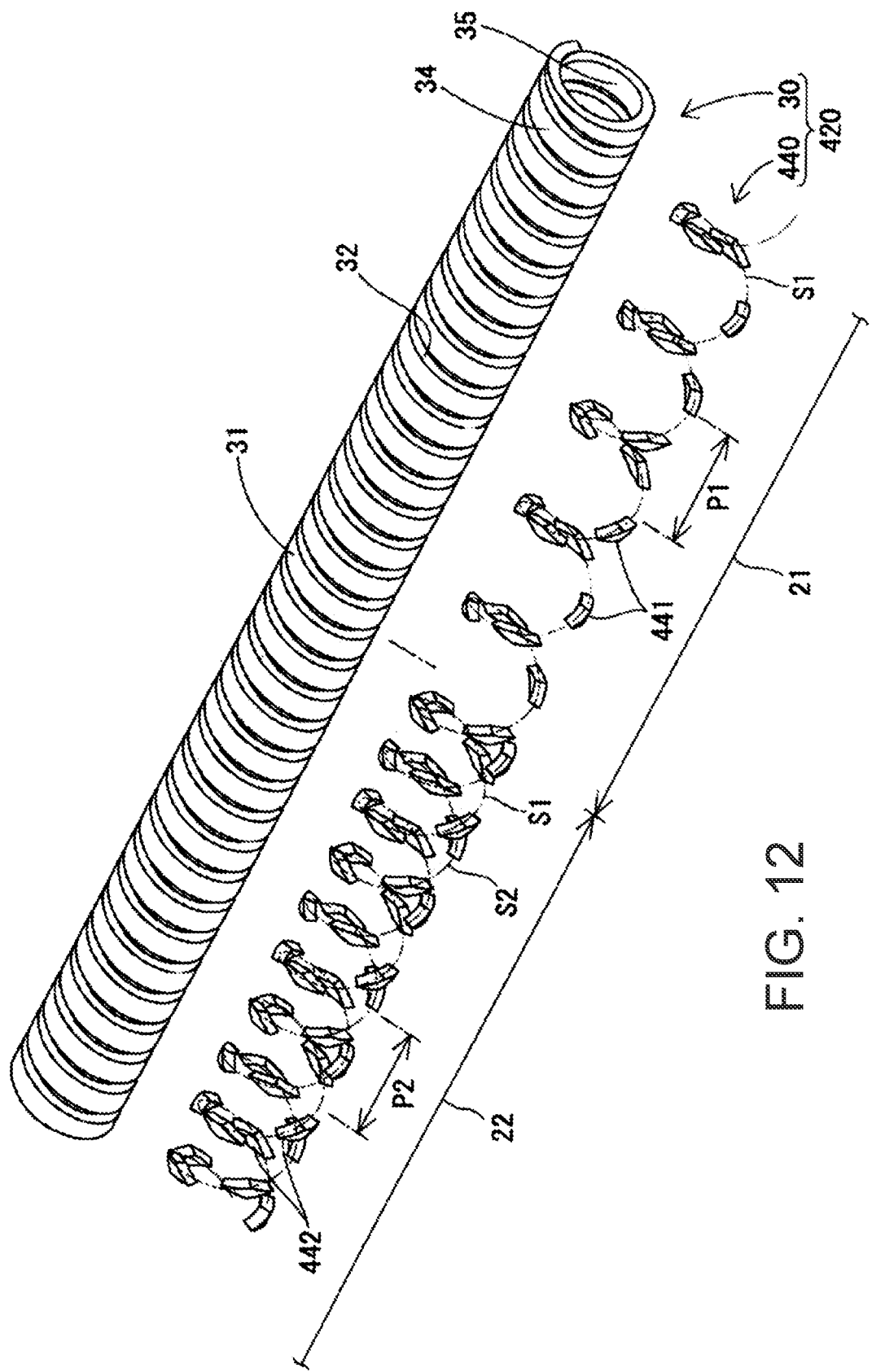
FIG. 12 is an exploded perspective view of a rotation transmission structure.

As shown in FIG. 11 and FIG. 12, a rotation transmission structure 420 according to an embodiment of the present disclosure has a reinforcing body with a different configuration to that of the rotation transmission structure 20 described above. Configurations that are identical to those in the rotation transmission structure 20 are designated by the same reference numerals, and duplicate description will not be repeated.

The reinforcing body 440 is configured by a plurality of connection portions 441 and 442 provided in each section that connects the wires 31 to one another. Among the plurality of connection portions 441 and 442, the plurality of connection portions 441 are arranged in the first region 21, and the plurality of connection portions 442 are arranged in the second region 22. The plurality of connection portions 441 are arranged along a single virtual helical shape S1. The plurality of connection portions 442 are arranged along two virtual helical shapes S1 and S2. The helical shapes S1 and S2 are in the opposite direction to the winding direction of the coil body 30, and for example, when the coil body 30 is wound in an anticlockwise direction toward the distal end (S-twisted), the plurality of connection portions 441 and 442 are arranged along the virtual helical shape S1 which is wound in a clockwise direction toward the distal end (Z-twisted). The pitch P1 of the helical shape S1 is the same as the pitch P2 of the helical shape S2.

In the present embodiment, the rigidity of the rotation transmission structure 420 can be suitably adjusted by a simple configuration in which the number of helical shapes S1 and S2 is changed. The rigidity of the rotation transmission structure 420 decreases in steps from the second region 22 toward the first region 21.

A rotation transmission structure 520 according to an embodiment of the present disclosure is different than the rotation transmission structure 20 in that it constitutes a guide wire 510. Configurations that are identical to those in the rotation transmission structure 20 are designated by the same reference numerals, and duplicate description will be omitted.

Figure 13:
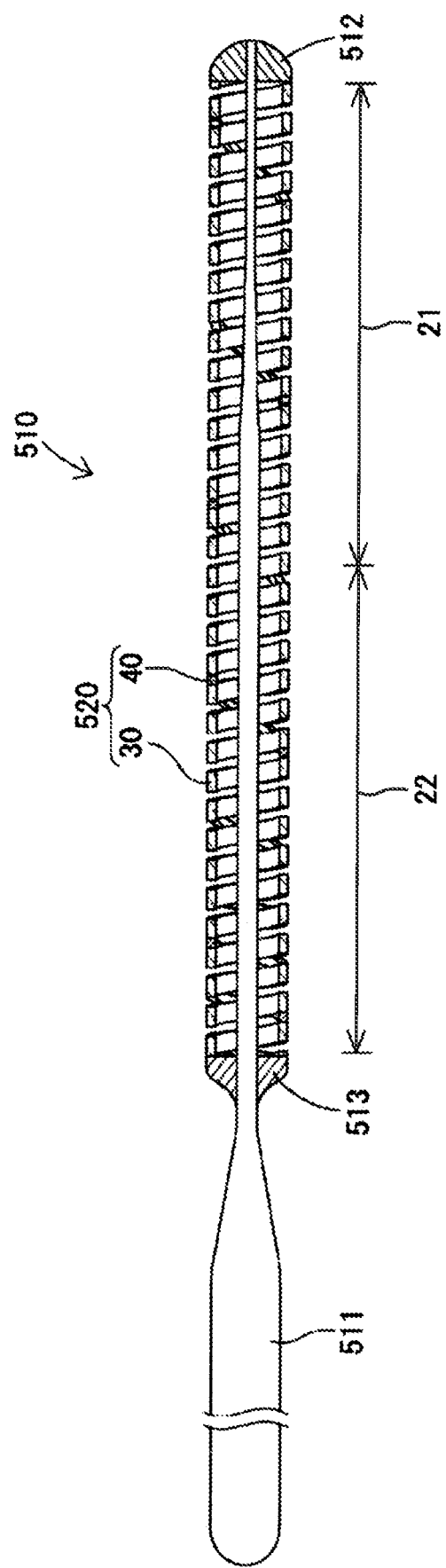
FIG. 13 is an overall view of a guide wire according to an embodiment of the present disclosure.

FIG. 13 is an explanatory diagram showing a guide wire (a type of medical device) 510 provided with the rotation transmission structure 520. The guide wire 510 includes the rotation transmission structure 520, a core shaft 511 inserted through the lumen of the rotation transmission structure 520, and the like. The distal end of the rotation transmission structure 520 and the distal end of the core shaft 511 are connected by a distal end brazed portion 512, and the proximal end of the rotation transmission structure 520 and the intermediate portion of the core shaft 511 are connected by a proximal end brazed portion 513.

The rotation transmission structure 520 includes a coil body 30 and a reinforcing body 40. The rotation transmission structure 520 has a first region 21, and a second region 22 located on the proximal end side of the first region 21. The first region 21 corresponds to a predetermined region in the longitudinal direction. The second region 22 corresponds to another region. The configuration of the rotation transmission structure 520 is the same as that of the rotation transmission structure 20, and the description thereof will not be repeated.

In the guide wire 510 of the present embodiment, the first region 21 of the rotation transmission structure 520 is located on the distal end side of the second region 22. As a result, it is possible to realize a guide wire 510 having excellent rotation transmission properties and which ensures flexibility of the distal end portion.

The disclosed embodiments are not limited to the examples described in the above description and drawings, and for example, the following examples are also included in the technical scope of the present disclosure.

(1) In addition to the embodiments above, the positions and ranges of the first region and the second region of the rotation transmission structure can be appropriately changed. For example, the first region is not limited to being the distal end portion of the shaft portion, and may constitute any region of the shaft portion that requires flexibility. The second region is not limited to being on the proximal end side of the first region, and may be located on the distal end side. The second region is not limited to being the entire region other than the first region, and may constitute a partial region. Further, in addition to the intermediate region, the rotation transmission structure may have a third region having a different rigidity from those in both the first region and the second region.

(2) The configuration in which the rigidity of the rotation transmission structure is changed by the reinforcing body is not limited to the configurations of the embodiments above. For example, the rigidity of the rotation transmission structure can be changed by combining changes in one or more of the size of the reinforcing body, the physical properties of the material forming the reinforcing body, the pitch of the helical shape, and the number of the helical shape(s).

Figure 14:
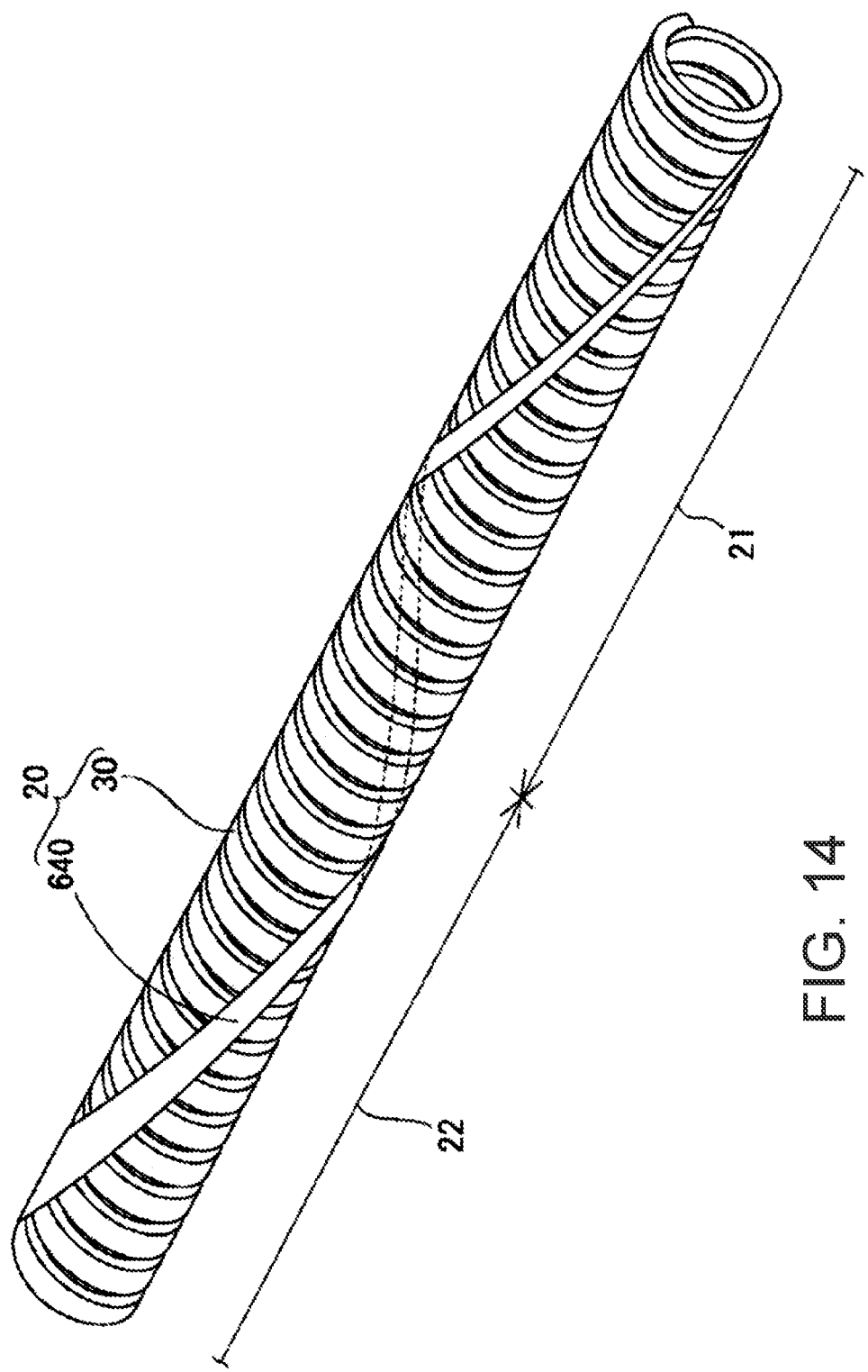
FIG. 14 is a perspective view showing a reinforcing body according to an embodiment of the present disclosure.

(3) The reinforcing body is not limited to being configured by a plurality of connection portions, and may be configured by a single member. In such a case, as shown in FIG. 14, a reinforcing body 640 may be formed with a longitudinal shape with a smaller width dimension toward the distal end side, and sections in which the width dimension of the reinforcing body 640 are different may be provided in the first region 21 and the second region 22. Furthermore, the reinforcing body 640 configured by such a single member may be provided on the outside of the coil body 30 as shown in FIG. 14, or may be provided on the inside of the coil body.

(4) The plurality of connection portions may be arranged along a virtual helical shape in the same direction as the winding direction of the coil body. The plurality of connection portions do not have to be arranged along a virtual helical shape, and for example, may be arranged along the longitudinal direction of the coil body.

(5) In addition to the above embodiments, the configuration of the coil body can be changed. For example, the coil body may have regions having different rigidities when not connected by the reinforcing body. It is also possible for the coil body to be densely wound such that it does not have gaps between the wires. The winding direction of the coil body is not limited.

(6) The above embodiments illustrate configurations in which the diameter of the wires is substantially constant over the entire length, however the diameter of the wires may also become thinner from the proximal end toward the distal end.

(7) The manner in which the rigidity of the rotation transmission structure changes is not limited to the configurations of the above embodiments. The rigidity of the rotation transmission structure may change gradually, or may change in steps with an arbitrary number of steps.

(8) The rotation transmission structure may be provided in a medical device other than a catheter, such as a guide wire. The rotation transmission structure may be coated with a resin layer or the like depending on the medical device in which it is used.

The invention claimed is:

1. A rotation transmission structure comprising:
a coil body and
a reinforcing body that connects adjacent wires of the coil body,
wherein the reinforcing body is configured such that a rigidity of a first region of the rotation transmission structure in a longitudinal direction is lower than a rigidity of a second region of the rotation transmission structure in the longitudinal direction, wherein
the reinforcing body comprises a plurality of connection portions that connect the wires to one another in each of the first and second regions, and
the plurality of connection portions are arranged along a virtual helical shape in an opposite direction to a winding direction of the coil body.

2. The rotation transmission structure according to claim 1, wherein:
the reinforcing body comprises a plurality of connection portions provided in each of the first and section regions, and
the plurality of connection portions are arranged more sparsely in the first region than in the second region.

3. The rotation transmission structure according to claim 2, wherein:
the plurality of connection portions are arranged along a virtual helical a pitch of the helical shape in the first region is larger than a pitch of the helical shape in the second region.

4. A rotation transmission structure according to claim 1, wherein:
a Young's modulus of a material of the connection portions arranged in the first region is smaller than a Young's modulus of a material of the connection portions arranged in the second region.

5. A rotation transmission structure according to claim 1, wherein:
the plurality of connection portions are arranged along multiple virtual helical shapes in at least one of the first and second regions.

6. A rotation transmission structure according to claim 1, wherein an outer diameter of the reinforcing body is arranged on an inner peripheral side of a virtual cylindrical surface circumscribed around an outer peripheral surface of the coil body.

7. A rotation transmission structure according to claim 1, wherein an outer diameter of the reinforcing body is arranged on an outer peripheral side of a virtual cylindrical surface inscribed in an inner peripheral surface of the coil body.

8. A catheter comprising a shaft portion reinforced by the rotation transmission structure according to claim 1, wherein the first region of the rotation transmission structure is located on a distal end side of the second region.

9. A guide wire comprising:
the rotation transmission structure according to claim 1; and
a core shaft inserted through a lumen of the rotation transmission structure,
wherein the first region of the rotation transmission structure is located on a distal end side of the second region.

10. A rotation transmission structure according to claim 1, wherein:
the plurality of connection portions are connected to each other to form a single member.

* * * * *